United States Patent [19]

Matsuno et al.

[11] Patent Number: 5,781,743
[45] Date of Patent: Jul. 14, 1998

[54] SYSTEM AND METHOD FOR DISTRIBUTED DATA PROCESSING USING DIFFERENT SERVER SYSTEM SPECIFICATIONS

[75] Inventors: Hideki Matsuno, Osaka; Kazuhiro Katayama, Takarazuka; Hiromichi Ishikawa, Fujisawa, all of Japan

[73] Assignee: Hitachi, Ltd., Tokyo, Japan

[21] Appl. No.: 390,501

[22] Filed: Feb. 17, 1995

[30] Foreign Application Priority Data

Feb. 18, 1994 [JP] Japan ..................... 6-020896

[51] Int. Cl.⁶ ........................ G06F 13/00; G06F 15/16
[52] U.S. Cl. ..................... 395/200.58; 395/200.33; 395/200.76
[58] Field of Search ............... 395/200.03, 600, 395/200.58, 200.33, 200.76; 707/203

[56] References Cited

U.S. PATENT DOCUMENTS

| | | | |
|---|---|---|---|
| 5,416,917 | 5/1995 | Adair et al. | 395/500 |
| 5,428,782 | 6/1995 | White | 395/650 |
| 5,475,819 | 12/1995 | Miller et al. | 395/200.03 |
| 5,506,985 | 4/1996 | Motoyama et al. | 395/600 |
| 5,522,066 | 5/1996 | Lu | 395/600 |
| 5,557,780 | 9/1996 | Edwards et al. | 395/500 |
| 5,564,113 | 10/1996 | Bergen et al. | 395/600 |

*Primary Examiner*—Mark H. Rinehart
*Attorney, Agent, or Firm*—Antonelli, Terry, Stout & Kraus, LLP

[57] ABSTRACT

In a distributed application program system which includes a data transmission line, a plurality of server systems connected to the data transmission line and each including at least one application program for executing data processing by running the program, and a client system connected to the data transmission line and including at least one application program for executing data processing by running the application program, a method of controlling the distributed application program system is performed. The method includes the steps of preparing a library for storing system specifications of the individual systems in association with one of the plural server systems which is to serve as a master server system, and deciding whether or not a table provided in association with the client system already contains system specifications of the server system to which data processing is to be entrusted. Unless the table holds the system specifications, the client system requests sending of the system specifications and stores the system specifications received from the master server system. Thereafter, the client system converts the data so as to have a format which conforms with the system specifications stored in the table.

8 Claims, 9 Drawing Sheets

FIG.5

LIBRARY INFORMATION OF MASTER SERVER SYSTEM 5
_52_

| SYSTEM IDENTIFIER | DISTRIBUTED AP NAME | API | GUI | ... | FACULTY | LOAD |
|---|---|---|---|---|---|---|
| SERVER SYSTEM 0 (SV0) | AP11 | a | A | ... | F | 3 |
| | AP12 | b | A | ... | F | 1 |
| SERVER SYSTEM 1 (SV1) | AP21 | a | A | ... | G | 0 |
| | AP22 | b | B | ... | G | 2 |
| ... | ... | ... | ... | ... | ... | ... |
| CLIENT SYSTEM 1 (CL1) | AP | c | ... | ... | ... | ... |
| ... | ... | ... | ... | ... | ... | ... |

520 521 522 523 524 525

SYSTEM AND METHOD FOR DISTRIBUTED DATA PROCESSING USING DIFFERENT SERVER SYSTEM SPECIFICATIONS

BACKGROUND OF THE INVENTION

The present invention generally relates to a distributed data processing system in which a plurality of data processing systems are interconnected via a data transmission path such as a network, a communication line or the like so that data processing to be performed by a given one of the data processing systems can be entrusted to another system with the result of the processing executed by the latter being sent back to the given one processing system. The invention also relates to a control method or a distributed operation supporting method for the distributed data processing system. More particularly, the invention is concerned with a distributed data processing system (hereinafter also referred to as the distributed application program system) which includes data processing systems of different machine types and a distributed operation control or supporting method for the same.

As the scale of data processing systems and diversity thereof increase, there arises a demand for a distributed data processing system or distributed application program system with a view to distributing functions, load and risk among the systems constituting the distributed data processing or application program system. In this regard, there is an increasing trend for adopting an open system scheme for structuring or implementing a wide-range distributed data processing system by interconnecting the individual data processing systems of different machine types in place of adopting a scheme for making the system specifications common to all of the individual processing systems constituting the distributed application program system.

In order that the distributed data processing system constituted by different type machines can perform the data processing as if it conforms to common local system specifications without making the user be conscious of differences in the system specifications among the individual data processing systems, it is required that the system specifications such as interconnection specifications (types of protocol, etc.), performance or faculty (operation speed, number of concurrently executable tasks, etc.), graphical user interfaces (GUI), application interfaces (API), operation environments (type of database system, hardware type, etc.) and others must be made acceptable or admissible to the individual partaker data processing systems which partake in realizing the distributed application program system.

Under the circumstances, there has already been proposed a method according to which the system specifications of all the individual partaker data processing systems are previously registered in these systems, respectively, so that when it becomes necessary in a given one of the data processing systems to entrust data processing to another system, the given one system converts the interface specifications and other such information so as to conform with the data processing system to which the data processing is to be entrusted. As a technique which is based on this concept, there may be mentioned a distributed data processing system disclosed in JP-A-4-98921 in which information concerning the communication environments for individual computers connected to a network is previously registered in the individual computers, respectively, wherein the communication environment information is updated or managed at one place.

The hitherto known scheme mentioned above however suffers from a problem that the storage unit for storing the system specifications information has to be implemented in a large scale, because the system specifications of the processing systems which do not actually partake in the communication have to be previously registered also, thereby incurring degradation in the utilization efficiency or availability of the storage unit. Furthermore, in case connection and disconnection of data processing systems of various types to the network are made frequently for accommodating a recent tendency for downsizing of the system, the system specifications information registered in all the individual data processing systems have to be changed or updated, which provides a problem that updating or the like management of the system specifications information involved in the change of the system configuration and the system specifications becomes very troublesome.

SUMMARY OF THE INVENTION

In the light of the state of the art described above, it is an object of the present invention to provide a distributed application program system in which a plurality of data processing systems of different machine types are interconnected for performing data processing through cooperation of the individual data processing systems and which can easily cope with change or modification in the system configuration while ensuring execution of data processings with a high efficiency and reliability.

Another object of the invention is to provide an operation control or supporting method for the distributed application program system mentioned above.

Yet another object of the present invention is to provide a distributed application program system in which the user in charge of creating a program to be executed distributively by a plurality of different types data processing system can get rid of trouble or burden of taking into consideration the system specifications of the different types of the data processing systems partaking in the distributed application program system.

A further object of the present invention is to provide a distributed application program system in which the data processing can proceed with as if all the individual data processing systems were implemented with same system specifications, thus without need for taking into consideration the system specifications of the individual data processing systems such as interface specifications, etc.

It is yet another object of the present invention to provide a distributed application program system and a control method therefor which are capable of enhancing the throughput of the distributed application program system while optimizing the loads imposed on the individual data processing systems by monitoring the operating states thereof.

In view of the above and other objects which will become apparent as the description proceeds, there is provided according to an aspect of the present invention a distributed application program system in which a system specifications information managing library is provided for managing, a bloc or concentratively at one place the system specifications information such as the specifications for interconnections, performance or faculty, application interfaces, operation environments of the individual data processing systems. Upon occurrence of data transfer request for transferring data from a given one of the data processing systems to another system, any one of the given system requesting the data transfer, the destination data processing system or those located on the way along the transmission path acquires the system specifications information of the destination data processing system to which the data processing is to be entrusted from the system specifications information managing library mentioned above, whereon conversion of data such as application program interface, etc. is performed on the basis of the system specifications information as acquired so that the data conforms with the system specifications of the destination data processing system. The data resulting from the processing executed by the destination data processing system is sent back to the requester data processing system in which the data transfer request originates.

In the distributed application program system of the structure described above, when a data transfer request or data processing execution entrust request is issued for transferring data from one data processing system to another system, the data processing system which issued the data transfer request can acquire from the system specifications information managing library the system specifications information concerning the destination data processing system to which the data processing is to be entrusted.

In this manner, the requester data processing system can dynamically acquire the system specifications information of the destination data processing system by issuing the data transfer request. On the basis of the system specifications information, the requester data processing system converts the data format such as for the application program interface (API), etc. so that it conforms with the system specifications of the destination data processing system and requests the latter for data processing.

Thus, the users of the data processing systems can proceed with the data processing on the presumption as if the distributed application program system were constituted by the data processing systems of same system specifications, thus without need for paying attention to the system specifications such as interface specifications, etc. of the individual data processing systems.

Further, since there is no necessity for storing the system specifications information of all the individual data processing systems, the storage unit for storing the system specifications information can be rendered unnecessary in principle. However, if the system specifications information managing library must be accessed every time the data transfer request is issued, it is expected that overhead involved thereby increases to lower the throughput of the system. Accordingly, it is desirable to store the system specifications information once acquired in the relevant individual data processing system so that upon occurrence of succeeding data transfer, the system specifications information stored is first referenced with the system specifications information library being accessed only when the relevant system specifications information is not stored.

Further, when the system configuration is to be changed or modified, it is sufficient to update correspondingly only the contents of the system specifications information managing library, which means that changes in the system configuration can easily be coped with, to another advantage of the present invention.

BRIEF DESCRIPTION OF THE DRAWINGS

In the course of the description which follows, reference is made to the drawings, in which:

FIG. 5 is a view for illustrating, by way of example, contents of a system specifications information managing library employed according to the invention;

DESCRIPTION OF THE PREFERRED EMBODIMENTS

The present invention will now be described in detail in conjunction with preferred or exemplary embodiments thereof by reference to the drawings.

Figure 1:
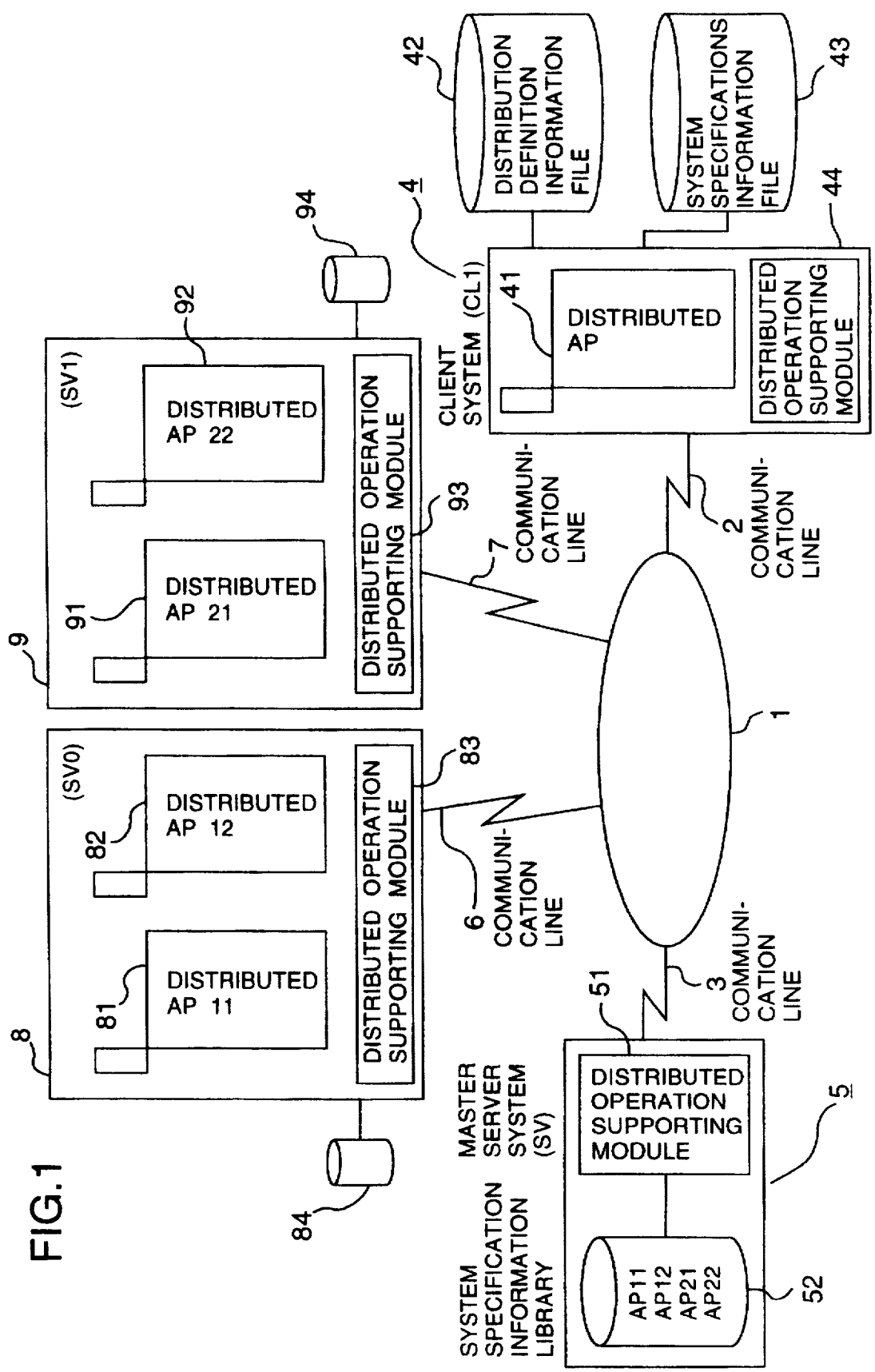
FIG. 1 is a block diagram showing in general a system configuration of a distributed application program system according to an embodiment of the present invention.

FIG. 1 is a block diagram showing a configuration of a client/server type distributed data processing system (i.e., a distributed application program system, to say in another way) to which a distributed operation control or supporting method according to an embodiment of the invention is applied. As can be seen in the figure, there are connected to a network 1 a client system (CL1) 4 and a master server system 5 via communication lines 2 and 3, respectively, and a plurality of server systems (SV0, SV1, etc.) typified by those denoted by reference numerals 8 and 9 via respective communication lines 6 and 7.

The client system 4 incorporates therein a distributed operation supporting module 44 for controlling or supporting execution of a distributed application program (also referred to as the distributed AP in abbreviation) 41 allocated to the client system 4. Further, the client system 4 is equipped with a distribution definition information file 42 for defining a counterpart one of the plural server systems 5, 8 and 9 which is capable of executing a transaction indicated by a transaction name designated by the distributed application program 41, i.e., the destination server system to which the client system 4 can entrust execution of the transaction processing and a system specifications information storing file 43 for storing information concerning the system specifications acquired from a system specifications information managing library 52 to be used in interface conversion, which will be described in detail hereinafter.

More specifically, the system specifications information storing file 43 is provided with the aim of avoiding such situation that a system specifications information managing library 52 (described hereinafter) is accessed every time the data processing execution is entrusted to the server system 8 or 9, because, if otherwise, overhead as involved increases with the throughput of the whole system being degraded. To be more concrete, when the client system 4 desires to entrust a transaction processing to the server system 8 or 9, the system specifications information storing file 43 is first accessed with preference over the system specifications information managing library 52, which is accessed only when the system specifications information of the server system 8 or 9 is unavailable from the system specifications information storing file 43.

On the other hand, the master server system 5 incorporates therein a distributed operation supporting module 51 for controlling or supporting the distributed operation and is equipped with the aforementioned system specifications information managing library 52 for managing concentratively or en bloc the system specifications information such as the specifications concerning the interconnections between the server systems 8 and 9 and the client system 4, capabilities or faculties thereof, application interfaces, operation environments and the like.

The distributed operation supporting module 51 of the master server system 5 is imparted with a function or faculty for monitoring the operating states of the individual server systems 8 and 9 for the purpose of realizing a load optimization, as will be described later on.

A plurality of server systems 8 and 9 include distributed application programs 81 and 82 (also referred to as AP11 and AP12) and distributed application programs 91 and 92 (also referred to as AP21 and AP22), respectively, together with distributed operation supporting modules 83 and 93 for controlling or supporting execution of these distributed application programs. Additionally, the server systems 8 and 9 are provided with distribution definition information files 84 and 94, respectively, which are similar to the distribution definition information file 42 of the client system 4.

Figure 2:
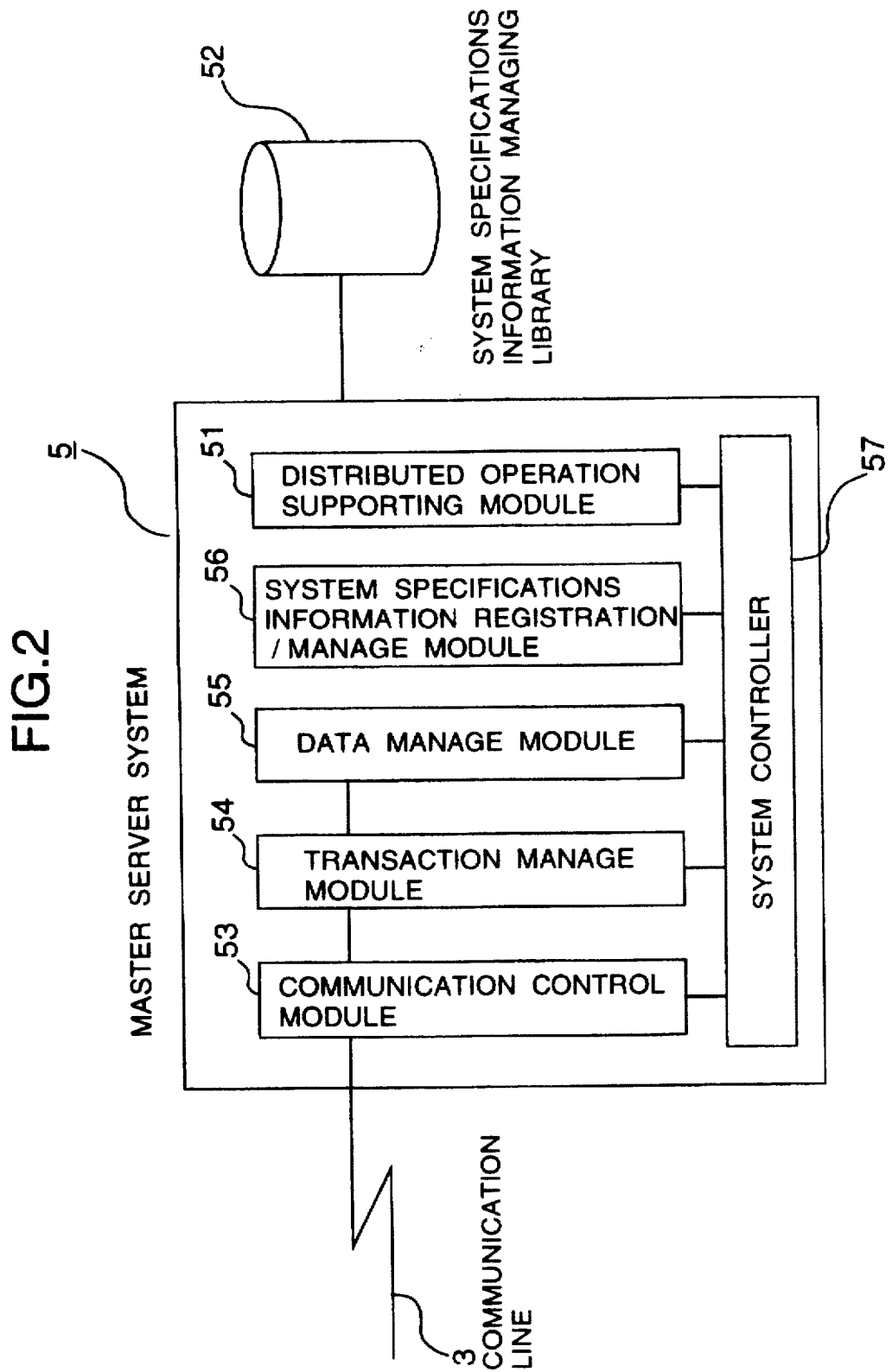
FIG. 2 is a schematic block diagram showing a structure of a master server system according to an embodiment of the invention.

FIG. 2 is a block diagram showing in detail a structure of the master server system 5. As can be seen in the figure, the master server system 5 is comprised of a communication control module 53, a transaction managing module 54, a data managing module 55, a system specifications information registration/management module 56 and a system controller 57 in addition to the distributed operation supporting module 51 mentioned above.

Figure 3:
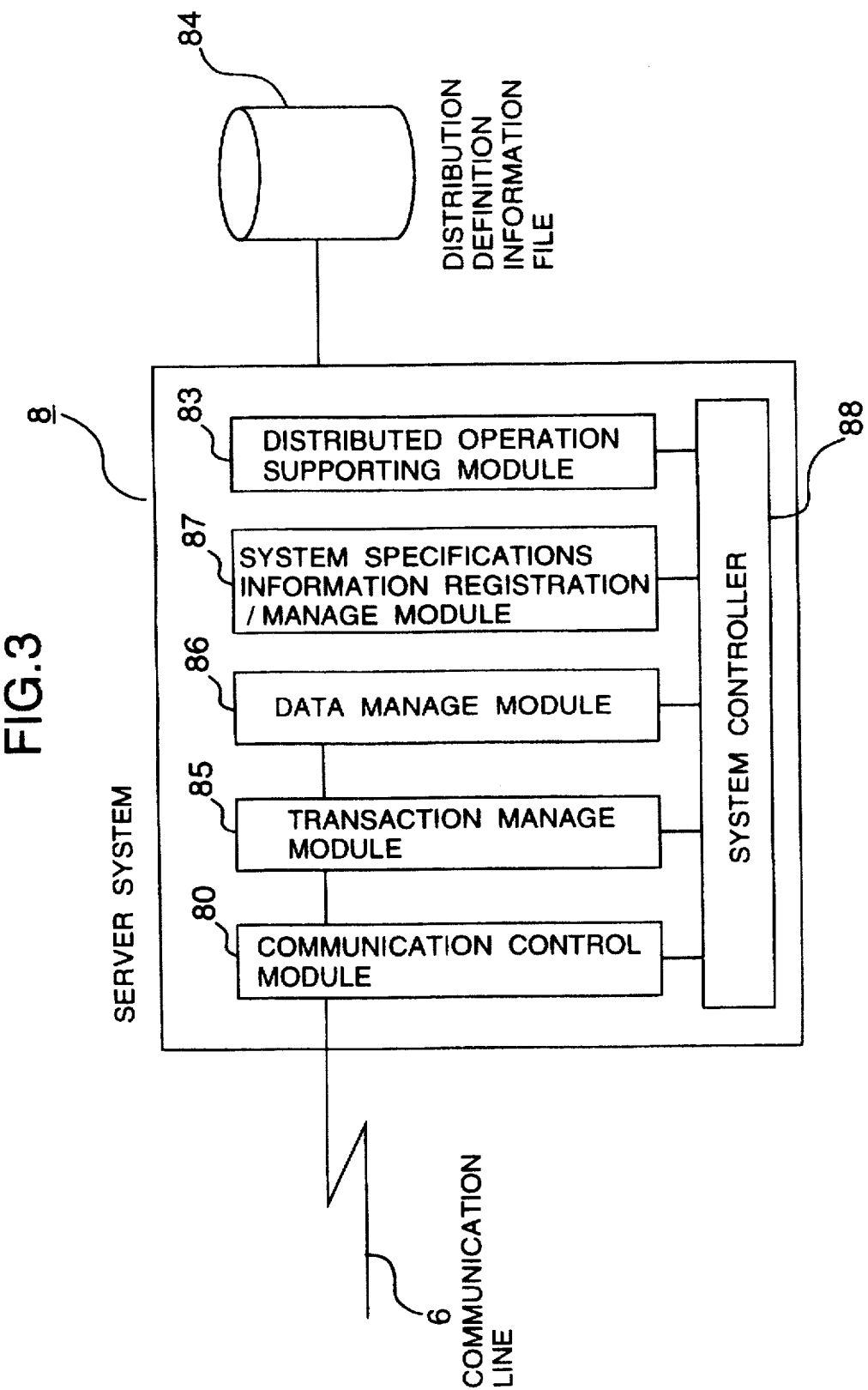
FIG. 3 is a schematic block diagram showing a structure of a server system according to an embodiment of the invention.

FIG. 3 is a block diagram showing in detail a structure of the server system 8 representatively for both the server systems 8 and 9. As is apparent from the figure, the server system 8 includes a communication control module 80, a transaction managing module 85, a data managing module 86, a system specifications information registration/management module 87 and a system controller 88 in addition to the distributed operation supporting module 83.

Figure 4:
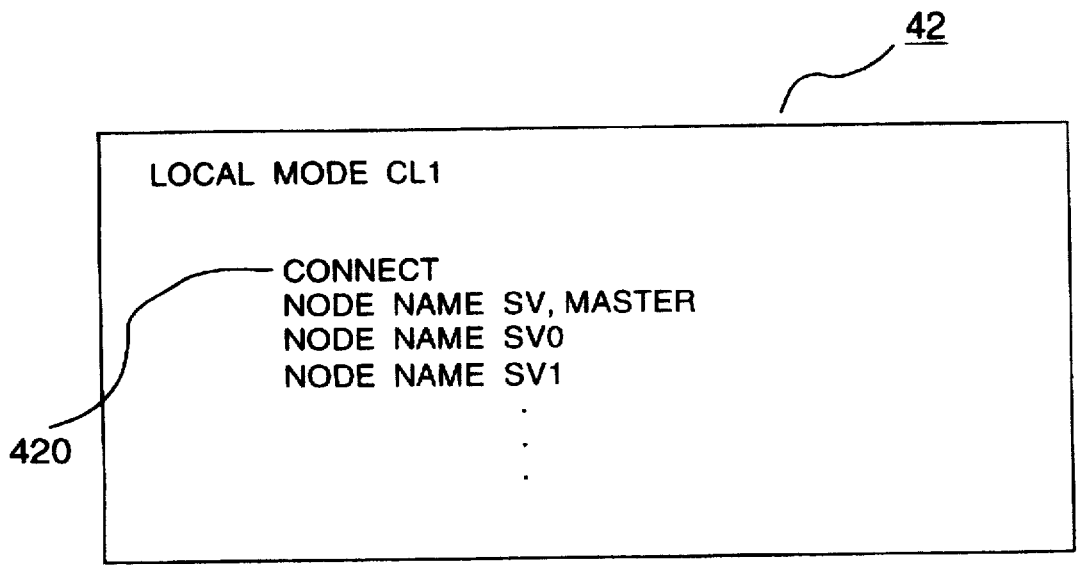
FIG. 4 is a view for illustrating, by way of example, contents of distribution definition information used in carrying out the invention.

FIG. 4 is a view for illustrating, by way of example only, contents of the distribution definition information stored in the distribution definition information file 42 provided in association with the client system 4 (see FIG. 1). In the figure, symbol "CL1" is an identifier of the client system 4, "SV0" represents the server system 8, "SV1" represents the server system 9 and "MASTER" represents the master server system 5, wherein definition is made such that the client system 4 is connectable (as indicated by "CONNECT" 420) to the server systems 8 and 9 and the master server system 5 as indicated by the descriptions following "NODE NAME".

FIG. 5 is a chart for illustrating examples of the system specifications information of the server systems 8 and 9 and the client system 4 which are stored in the system specifications information managing library 52 of the master server system 5. As can be seen from the figure, there are prepared for each of the systems (server and client systems) columns for string information such as system identifiers (column 520), distributed application program names (column 521 labelled "DISTRIBUTED AP NAME"), application program interfaces (column 522 labelled "API"), graphical user interfaces (column 523 labelled "GUI"), . . . , faculties (column 524 labelled "FACULTY") and loads (column 525 labelled "LOAD"), respectively. Taking as example the server system 8 (SV0), it is defined that there are provided for this server system 8 (SV0) a distributed application program "AP11" for which the application program interface (API) is of a type "a", the graphical user interface (GUI) is of a type "A" and the faculty is indicated by "F" as well as a distributed application program "AP12" for which the application program interface (API) is of a type "b", the graphical user interface (GUI) is of a type "A" and the faculty is represented by "F".

At this juncture, it is to be noted that load information "LOAD" represented quantitatively by a numerical value and indicating a current operation state is set for each of the distributed application programs. This load information is determined on the basis of the result of check of the server systems 8 and 9 performed by the master server system 5, as described later on. The no-load state is represented by a numerical value "0".

Incidentally, the numerical value itself used as the load information may be given by a number of tasks being executed currently or a value representing a level determined by a five-level gradation evaluation method.

The application program interface (API) has interface specifications oriented for the system calls for allowing the distributed application programs to use the function of an operating system OS and defined, for example, in terms of a library function of C-language. As the typical ones of the application program interface (API), there may be mentioned ODBC (Open DataBase Connectivity) and CLI (Call Level Interface)

The graphical user interface (GUI) is of such interface specifications in which graphics are used as the means for interfacing the operator, a human being, and machine parts such as a display, a mouse and a keyboard. As the typical graphical user interfaces (GUI) known in the art, there may be mentioned, for example, X Windows System, OSF//Motif and OPEN LOOK interfaces.

The faculty may be defined by, for example, a MIPS (Million Instructions Per Second) value or a number of users/tasks which the system can accommodate simultaneously.

In addition to the information mentioned above, there may be defined information concerning interconnection specifications specifying the network protocol (such as TCP/IP (i.e., Transmission Control Protocol/Internet Protocol) and OSI (Open Systems Interconnection) as well as operation environment information such as of the configuration of a network to which the server system of concern belongs and system environments such as database type, hardware species and the like.

Figure 6:
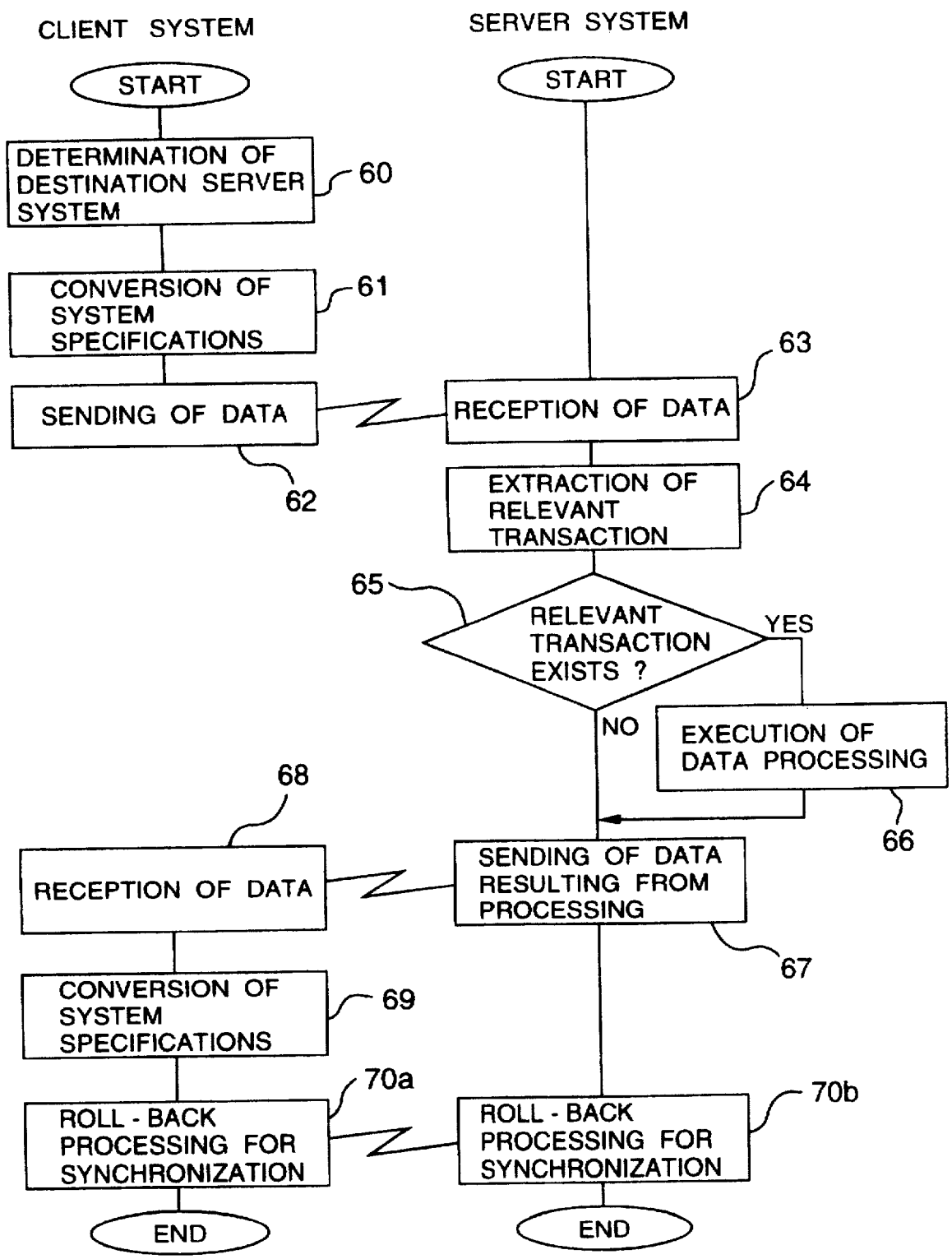
FIG. 6 is a flow chart showing a processing procedure executed in the distributed application program system according to an exemplary embodiment of the invention.

Before entering into detail of operation of the system according to the instant embodiment by reference to a flow chart shown in FIG. 6, it will be helpful to make a survey in brief. It is presumed that the client system 4 has a same communication protocol as that of the master server system 5 and is capable of accessing directly the latter.

Now, let's assume that in the course of execution of the distributed application program (AP) 41 in the client system 4, there takes place a distributed processing request for entrusting the data processing to the server system 8 or 9. In that case, the client system 4 references the distribution definition information file 42 to detect or recognize the server system to which the connection can be established from the client system 4 and which is in the position to cope with the distributed processing request, i.e., the server system equipped with the distributed application program which is capable of performing the transaction.

In this conjunction, let's again assume that load concentration takes place in the server system 9 of both the server systems 8 and 9 and that the former is in the operation state incapable of immediately taking action for the data processing request from the client system 4. In that case, there is selected the distributed application program of the same system specifications which is in a light load state or alternatively the distributed application program of another server system such as that of the server system 8 to which the connection can be established. After selection, for example, of the server system 8, the client system 4 inquires the master server system 5 for the system specifications information of the server system 8 via the network 1 to thereby acquire the system specifications information of the server system 8 from the system specifications information managing library 52 of the master server system 5.

Figure 7:
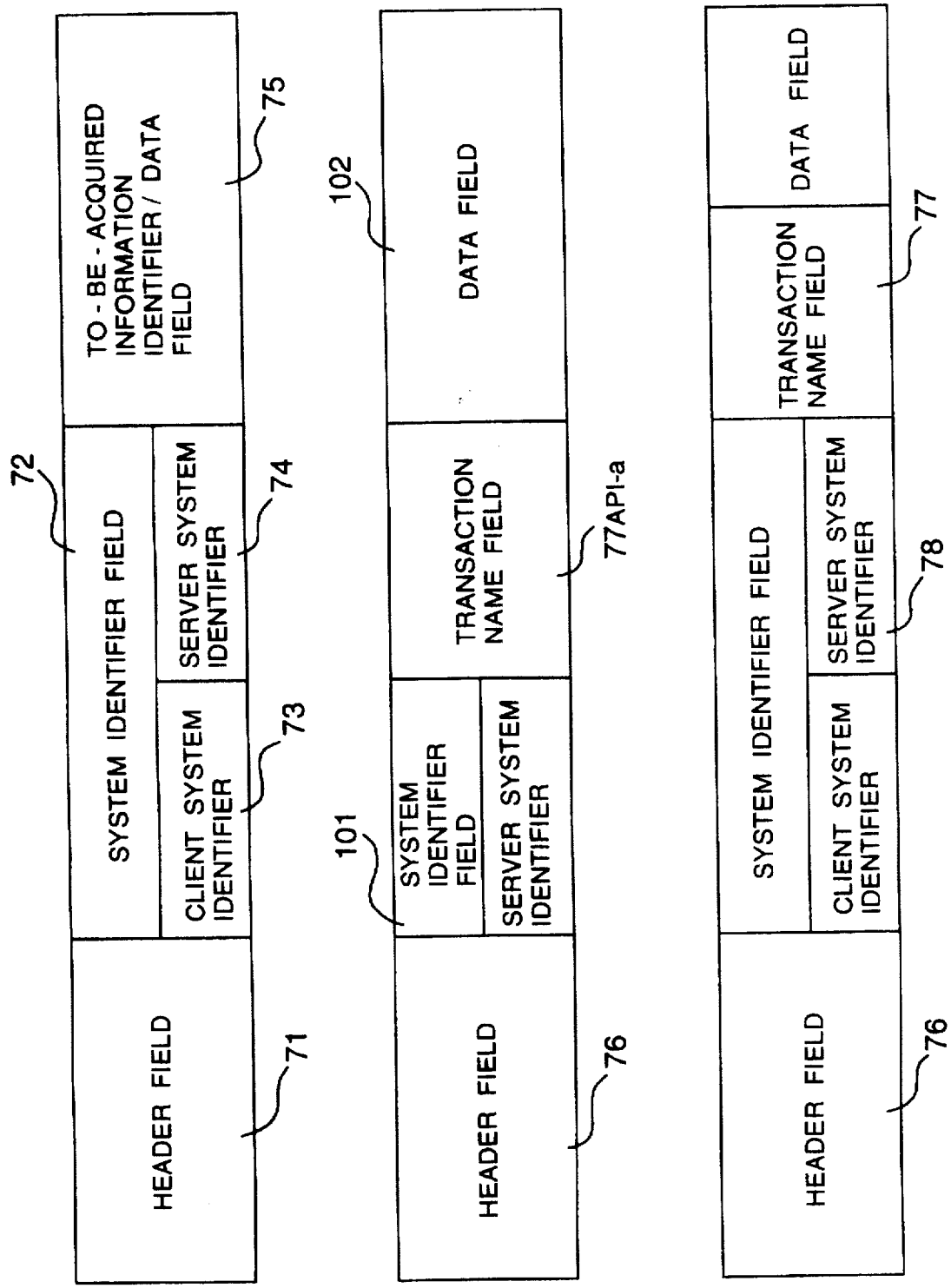
FIGS. 7A to 7C are data format diagrams showing exemplary formats of data to be transferred.

In this inquiry process, the system specifications information of the server system 8 can be acquired by sending data of a data format such as shown in FIG. 7A from the client system 4 to the master server system 5. As can be seen from FIG. 7A, the data format is comprised of a leading header field 71 indicating a communication path, a system identifier field 72 succeeding to the header field 71 and containing the identifiers 73 and 74 of the client system 4 and the server system 8, respectively, and a trailing identifier field 75 containing an identifier of the information to be acquired. By sending the data of the format mentioned above, the client system 4 inquires the master server system 5 as to availability of the system specifications information of concern from the system specifications information managing library 52. The master server system 5 in turn extracts the information as inquired from the library 52 and sends back to the client system 4 the data containing the information in the identifier/data field 75.

On the basis of the system specifications information contained in the data received in the format shown in FIG. 7A and having the identifier/data field 75 storing the information as acquired, the client system 4 performs interface conversion so that the system specifications such as the application program interface (API) and the graphical user interface (GUI) of the client system 4 itself can conform with the system specifications of the server system 8 to which the transaction processing is to be performed, whereupon the client system 4 sends the data processing request as well as the relevant data to the destination or processing-entrusted application program of the server system 8 via the network 1. At this juncture, the phrase "interface conversion" means the conversion of protocol, data transfer rate, data format, code format and the like so that the entrusted processing can be executed by the destination application program of the processing-entrusted server system 8.

When the data processing request is sent, the data of a format having a server system identifier field 101 containing an identifier of the destination server system 8, a transaction name field 77 containing the name of transaction and a data field 102 containing the data to be processed, as shown in FIG. 7B, is sent to the server system 8.

Parenthetically, when the specification conversion and the data processing are to be entrusted to the master server system 5, data of a format having a header field 76, a system identifier field 78 containing system identifiers of the client system and the destination master server system, respectively, a transaction name field and a data field 77 containing the data to be processed, as illustrated in FIG. 7C, is sent to the master server system 5 via the network 1.

Thus, upon execution of the designated transaction, the master server system 5 or the server system 8 activates a distributed application program such as the distributed application program 81 (AP11) from the those allocated thereto to thereby execute the data processing as requested. The result of execution of the data processing is then sent back to the requestor client system 4 via the network 1 in the form of the data format which contains the data field 77, as shown in FIG. 7C.

Upon reception of the result of execution of the data processing from the master server system 5 or the server system 8, the requestor client system 4 converts the received data so that the system specifications such as the application program interface (API) and others conform with the system specifications of the client system 4 itself and transfers the data resulting from the conversion to the distributed application program 41.

Now, description will be made in more detail by reference to the flow chart of FIG. 6.

Upon occurrence of a distributed application program processing request in the course of execution of the distributed application program 41 by the client system 4, the latter makes access to the distribution definition information file 42 incorporated therein for thereby determining whether the name of the requested server system designated by the distributed application program 41 is contained in the table shown in FIG. 4 (step 60).

In this conjunction, it is to be noted that even if two server systems 8 and 9 are capable of executing the transaction processing having the name designated by the distributed application program 41, one of the server systems, e.g. the server system 8 is selected as the destination server system to be connected when the server system 9 is operating in the load-concentrated state incapable of dealing with the data processing request.

Subsequently, the client system 4 makes access to the system specifications information storing file 43 in precedence to the system specifications information managing library 52 of the master server system 5 for acquiring the system specifications information of the destination server system 8. When the system specifications information of the destination server system 8 is stored in the system specifications information storing file 43, the client system 4 acquires the system specifications information of the server system 8 from the system specifications information storing file 43.

However, when the system specifications information can not be found in the system specifications information storing file 43, the client system 4 inquires the master server system 5 for the system specifications information of the server system 8 via the network 1.

In response to the inquiry from the client system 4, the distributed operation supporting module 51 incorporated in the master server system 5 makes access to the system specifications information managing library 52 on the basis of the received data to thereby extract the system specifications information of the server system 8 from the system specifications information managing library 52, whereupon the distributed operation supporting module 51 sends back to the client system 4 the system specifications information (such as the format for the data (FIG. 7A) to be transferred, data type determined by the structure of the associated database, etc.) of the server system 8.

Upon reception of the system specifications information from the master server system 5, the client system 4 performs the interface conversion on the data to be sent to the server system 8 in accordance with the system specifications information received from the master server system 5 to thereby derive the data of a data format PDU (Protocol Data Unit) which conform with the system specifications of the server system 8 (step 61), whereupon the data resulting from the conversion is sent to the server system 8 (step 62).

In response to reception of the data from the requestor client system 4, the server system 8 extracts the relevant transaction name from the received data (steps 63 and 64). By making use of this transaction name as a key, the server system 8 searches the distribution definition information file 84 incorporated therein for the distribution definition information (step 65) to thereby decide whether or not the transaction of concern can be disposed of. When it is possible, the server system 8 activates the distributed application program 81 (AP11) to execute the transaction processing (step 66), whereupon the server system 8 sends the data resulting from the execution of the processing to the requester client system 4 (step 67) which is currently connected to the server system 8.

Parenthetically, when the transaction of concern is absent in the server system 8, an error response indicating that the transaction name is not hit is sent to the requestor client system 4.

Upon reception of the data resulting from execution of the transaction processing from the server system 8, the client system 4 converts the received data so as to conform with the system specifications of the client system 4 (steps 68 and 69), the data undergone the conversion processing being then transferred to the distributed application program 41. When the processing for the remaining transaction(s) has been completed in any one of the server systems, the distributed application program processing under consideration comes to an end.

Needless to say, when the distributed application program processing request is issued a number of times, the processing through the steps 60 to 69 is executed repetitively as required.

At the time point when all the distributed application program processings have been completed, a roll-back or synchronization processing is performed in order to secure conformity among the distributed application program processings executed by the systems involved in the processing requested by the distributed application program 41, whereupon the whole processing comes to an end.

Next, description will turn to a conversion method for the application program interface (API) and the graphical user interface (GUI).

In this conjunction, it should be mentioned that the conversion method for the graphical user interface (GUI) is similar to that for the application program interface (API). Accordingly, the description which follows will be directed to only the conversion method for the application program interface (API), being understood that the conversion method for the application program interface (API) can equally be applied to that for the graphical user interface (GUI).

As the method for conversion of the application program interface (API), there can be conceived (1) a method to be carried out by the master server system 5, (2) a method to be executed by the server system 8 or 9, and (3) a method to be executed by the client system 4.

(1) API Conversion Method Performed by Master Server System (a) In order to identify this method distinctively from those (2) and (3) described hereinafter, it is necessary for the client system 4 to send to the master server system 5 the data of a PDU format having a header field in which there are set both of a flag indicating the data processing request to the server system and a flag indicating the data conversion request to the master server system 5 in precedence to the processing of the data. Additionally placed in the header field is the information indicating the transmission routes of the data from the master server system to the server system as well as from the server system to the client system, respectively.

More specifically, data of the PDU (Protocol Data Unit) format having a header field 100 (76 in FIG. 7B), a system identifier field 101 indicating the master server system, a data field 102 and a transaction name field 103 is prepared to be sent to the master server system 5. The data field 102 may be comprised of a tag area 1021, a length area 1032, and a data areas 1023, as is shown in FIG. 8 (also refer to FIG. 7B).

(b) The master server system 5 in turn checks the conversion request flag contained in the header field of the received data to generate a relevant application program interface (API) parameter table 104. To be more concrete, there is implemented within the master server system 5 an application program interface table 52 having a system identifier column 520 for identifying the client system 4 in which the data originates and an application program interface information column 522 indicating the type of the application program interface (API), as shown in FIG. 8 (also refer to FIG. 5). In the case of the example shown in FIG. 8, "CL1" is set as the system identifier 520 of the client system 4 with "API-c" being set as the corresponding application program interface information 522, while "API-a" being set as the application program interface of the server system SV0.

Figure 8:
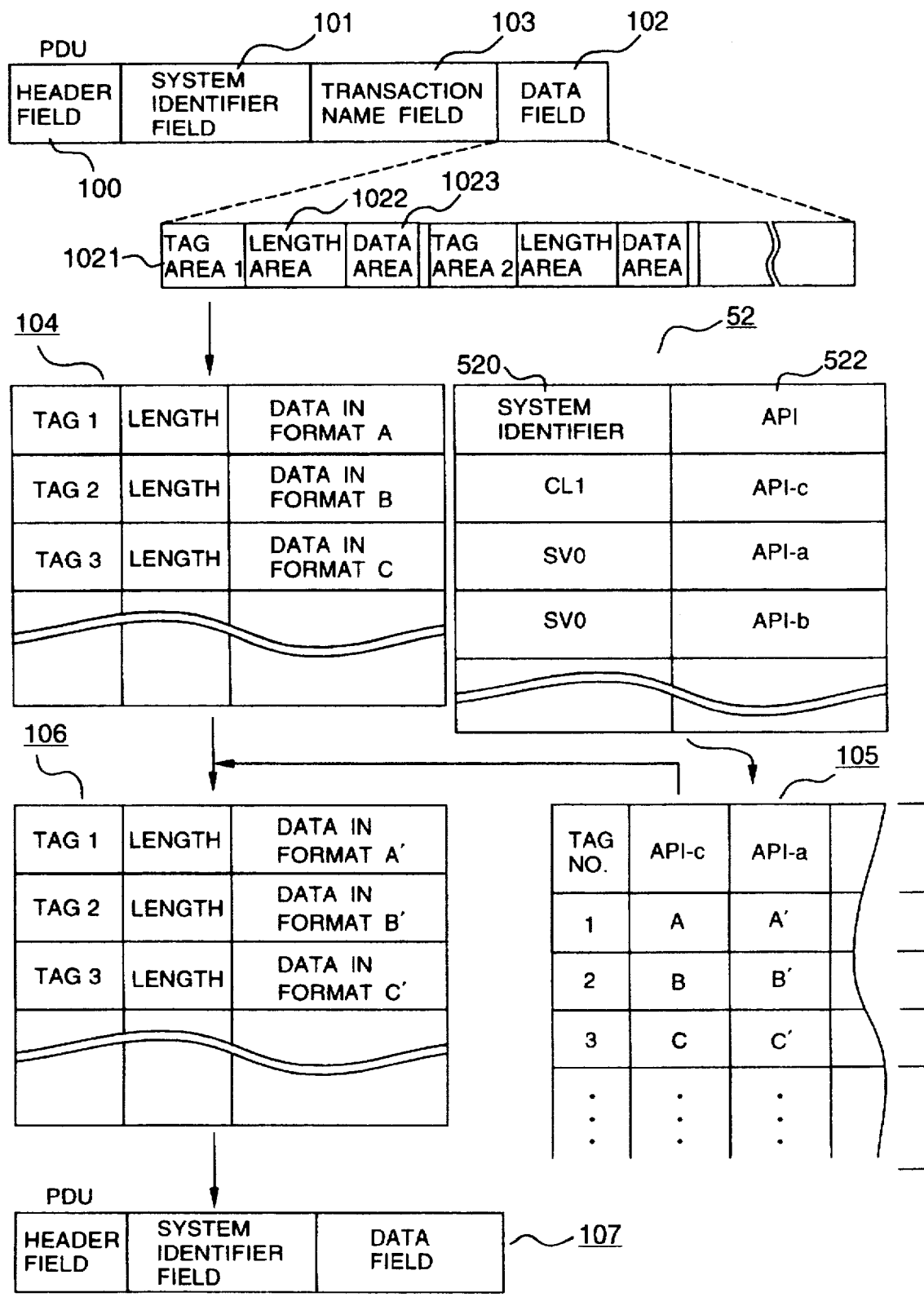
FIG. 8 is a flow chart for illustrating interface conversion performed by the master server system.

By referencing the application program interface table 52, the application program interface parameter table 105 such as shown in FIG. 8 is generated.

(c) Subsequently, on the basis of the application program interface parameter table 105, an application program interface parameter table 106 containing the data undergone parameter conversion such as shown in FIG. 8 is generated to be referenced in the succeeding processing. To say in another way, correspondence relation of the data between the requestor client system and the entrusted server system are defined in the application program interface parameter table 105. Thus, in accordance with the correspondence information as defined in the table 105, the application program interface parameter table 104 is converted or transformed into the application program interface parameter table 106 for the server system. Assuming, by way of example, that the parameter A which is an attribute of the data is given by a hexadecimal value with the parameter A' representing a character, data of the format A is hexadecimal data, while data of the format A' is character data.

(d) Subsequently, the master server system generates data for transfer by referencing the application program interface parameter table 106 oriented for the server systems and sends the data to the relevant server system 8 (or 9) the data by affixing the header containing a flag indicating the data processing request. At this juncture, it should be mentioned that the master server system is designed to inquire periodically the server systems for the operating states thereof with the aim to manage the destination system to which the transaction is to be performed.

(e) The server system 8 processes the data through the designated transaction in a substantially same manner as the conventional database access, to thereby send back the data undergone the processing to the client system 4 in accordance with the transmission route information stored in the header field of the data format.

(2) API Conversion Method Performed by Server System (a) In the client system 4, the data for transfer (i.e., the data whose processing is to be entrusted to the server system 8 or 9) is prepared to be sent to the server system 8 (or 9).

Figure 9:
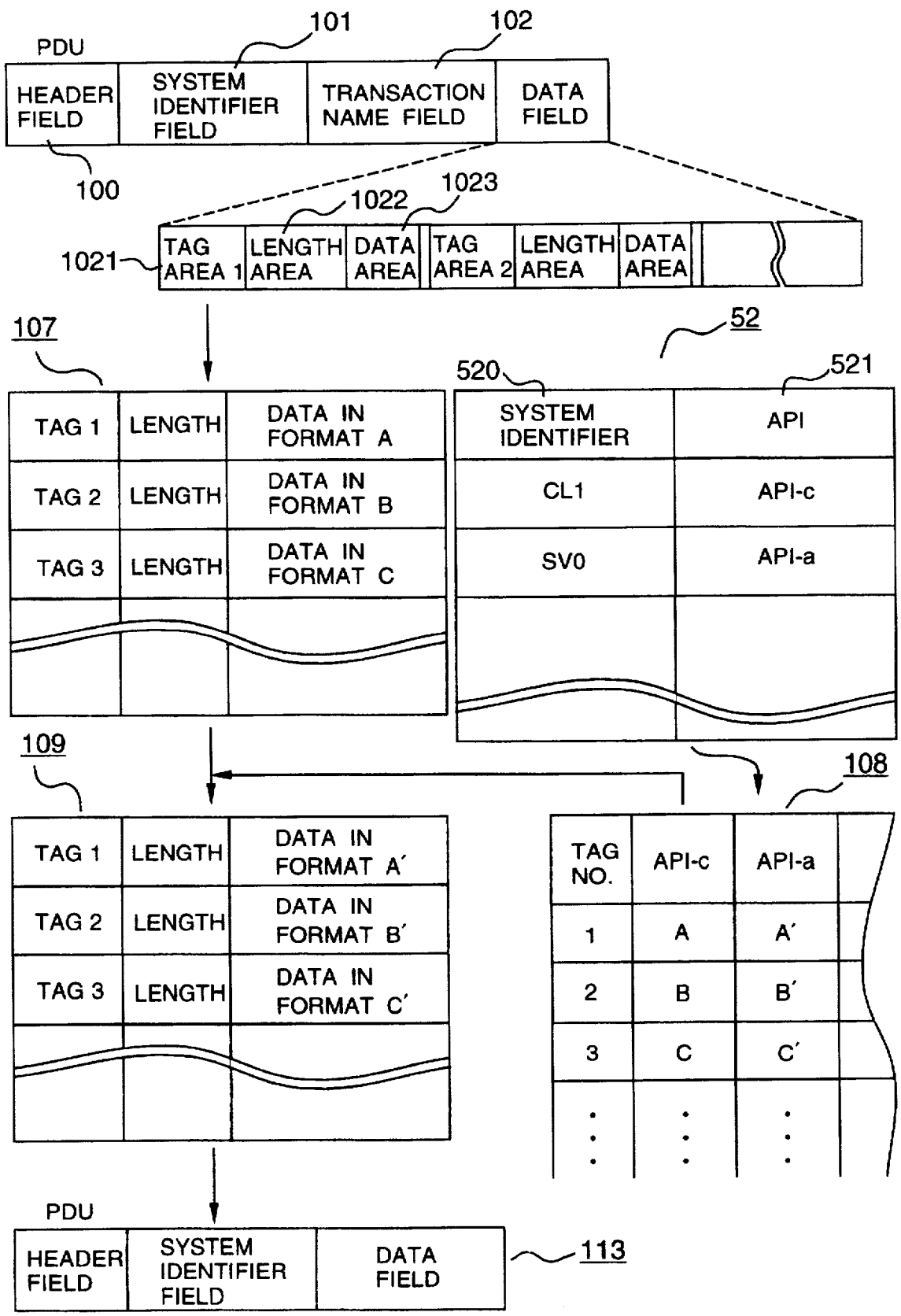
FIG. 9 is a flow chart for illustrating interface conversion performed by a server system or a client system.

More specifically, the client system 4 prepares the data of a PDU format having a header field 100, a system identifier field 101, a transaction name field and a data field 102, as shown in FIG. 9, and sends the data to the server system 8 by entrusting to the latter both the data conversion and the data processing.

(b) In response, the server system 8 generates an application program interface parameter table 107 for the client system 4.

(c) Subsequently, the server system 8 checks whether or not there exists an application program interface conversion table 108 for the client system 4 which is similar to that illustrated in FIG. 8. If the application program interface conversion table 108 for the client system 4 is available, the server system 8 references this table 108 for converting the application program interface parameter table 107 into a parameter table 109 oriented for the server system, as shown in FIG. 9.

Unless the server system 8 is equipped with the application program interface conversion table 108, the latter is acquired from the master server system 5 and converted to the parameter table 109 oriented for the server system.

(d) Subsequently, the parameter table 109 for the server system is converted into data 113 of the PDU format similar to that of the data 106 shown in FIG. 8 in order to allow the database access processing to be performed in common to those data received by way of the master server system 5. The data 113 of the PDU format containing the data undergone the processing is then sent back to the client system 4.

For monitoring the operating states of the individual server systems, the values of the loads of the server systems are managed by the master server system 5 upon reception of the transaction processing request. (The initial load value is zero.) Since the load values are contained in a table which is incorporated in the master server system 5 and which can be referenced by the individual server systems at the start and end of the transaction processing, respectively, each of the server systems can manage its own operating state.

As an alternative, such an arrangement may equally be adopted in which the individual server systems inform the master server system 5 of the respective operating states.

(3) API Conversion Method Performed by Client System (a) In this case, the client system 4 prepares data to be transferred (i.e., the data whose processing is to be entrusted to the server system 8 or 9). To be more concrete, the client system prepares the data of a format composed of a header field 100 and a data field 102 of the same contents as those designated by like reference characters in FIG. 9.

(b) Subsequently, a parameter table 107 oriented for the relevant client system is generated.

(c) In succession, it is checked whether or not the application program interface conversion table 108 for the client system is present in the client system 4. If the application program interface conversion table 108 is present, the application program interface parameter table 107 is converted to a parameter table 109 for the server system such as shown in FIG. 9 by referencing the application program interface conversion table 108 for the client system.

Unless the client system is not equipped with the application program interface conversion table 108, the latter is acquired from the master server system 5 and converted to the parameter table 109 for the server system.

(d) Now, the parameter table 109 for the server system is converted to data 113 of the PDU format to be sent to the server system 8.

(e) The server system 8 processes the data received from the client system 4 in accordance with the designated transaction information, the result of the processing being sent back to the client system.

As this juncture, it should be mentioned that when the interface conversion can not be effectuated by resorting to the methods described above, a corresponding error message may be issued to the user through an appropriate error processing.

Owing to the arrangement in which the client system 4 makes access to the table incorporated in the master server system 5 and containing the load values as mentioned above upon every start and end of the transaction, the current operating states of the individual server systems can be managed. The value of the load is updated by the master server system.

In the case of the distributed application program systems according to the invention described so far, it is the client system that determines the server system which is to perform the conversion of the system specifications information for the data. Accordingly, the data sent from the client system have to contain the specifications conversion request flag and the data processing request flag in the header field. The description which follows is directed to a system configuration in which the flags mentioned above can be spared.

Referring to FIG. 1, there are connected to the network 1 at least one server system which is provided with a database and designed to perform the data processing through transaction, at least one client system which can entrust the data processing to a given one of the server systems, and at least one master server system which is in charge of managing the system specifications information for the client system(s) and the server system. When the client system 4 entrusts the data processing to a given server system, the client system 4 generates in precedence the table 107 of the structure illustrated in FIG. 9. In case the application program interface (API) table 52 of the client system contains the application program interface information for the server system to which the data processing is to be entrusted, the client system generates the tables 108 and 109 on the basis of the above-mentioned application processing interface information and sends the data 113 of the PDU format undergone the system specifications conversion to the server system. On the other hand, unless the application program interface table 52 contains the application program interface information mentioned just above, the client system sends data of the format shown in FIG. 7A to the master server system for acquiring the application program interface information which is then set in the application program interface table 52. Thereafter, the client system 4 generates the tables 108 and 109 to send the data 113 of the PDU format 113 undergone the system specifications conversion to the server system. The latter then processes the data as received in accordance with the transaction designated by the system identifier. The data resulting from the above processing is sent back to the requestor client system. Details of the other operations are obvious from the description of the preceding embodiments of the invention. Accordingly, any further description will be unnecessary.

Next, description will turn to the processing which is involved when a server system 9 is to be newly connected to the network in the distributed application program system of the configuration shown in FIG. 1.

After the system environments for the server system 9 have been established, a utility for registering the system specifications information in the master server system 5 existing in the network (hereinafter, this utility will also be referred to as the system specifications information registration utility) is executed by the server system 9.

Upon execution of the system specifications information registration utility, the system specifications information registration/management module 87 is called to be activated by the system controller 88 shown in FIG. 3. The system specifications information registration/management module 87 reads out from the distribution definition information file 94 the information which depends on the system specifications (such as application program interface, graphical user interface and the like) to convert the information into a data format suited for the data transfer, to thereby generate the data of the PDU format by affixing a prefix indicating the communication processing.

Subsequently, the communication controller 84 is activated via the system controller 88 for sending the system specifications information data to the master server system 5 which incorporates the distributed operation supporting module 51.

Upon reception of the system specifications information data from the server system 9 by the master server system 5, the distributed operation supporting module 51 is activated by the communication control module 53 via the system controller 57.

The distributed operation supporting module 51 then accesses the system specifications information managing library 52 through a conventional accessing process similar to that resorted to for accessing the database to thereby register the system specifications information of the server system 9 as received.

In the case where the server system 9 is already registered in the system specifications information managing library 52 of the network, the processing for registering a new distributed application program 92 (AP22) in the server system 9 is performed in the manner described below.

In the server system 9, the system specifications information registration/management module 87 is activated by the system controller 88 upon registration of the relevant transaction in the distribution definition information file 94 with the aid of the system specifications information registration utility.

Upon completion of registration of the relevant transaction in the own distribution definition file 94, the system specifications information registration/management module 87 registers the relevant transactions in the distribution definition information file 94 through a procedure and a method usually employed for connecting newly the server system 9 to a trailing end of the network.

Revision and deletion of the system specifications can be executed through the similar procedure, the results of which are then registered in the system specifications information managing library 52.

We claim:

1. A distributed application program system, comprising:
a data transmission line;
a plurality of server systems connected to said data transmission line and a database and each including at least one application program for executing data processing by running one of said application programs;
a client system connected to said data transmission line and including at least one application program for executing data processing by running said application program; and a master server system including a library for storing system specifications of each of said server system and corresponding system specifications of said client system for outputting one of said system specifications in response to a request received via said data transmission line;

wherein said client system includes a table for storing the system specifications of one of server systems received from said master server system, means for converting data to a data format which conforms with the system specifications stored in said table, and means for transmitting data resulting from said conversion and an identifier designating a data processing application program to said one server system;

wherein one server system includes means for processing the data received from said client system by running the application program designated by said identifier and sending back data resulting from said data processing to said client system; and wherein when the application program designated by said system identifier contained in the data received from said client system is in an overload state, said one server system transfers said data to another one of said plurality of server systems for allowing said another one server system to process said data and send back the processed data to said client system.

2. A distributed application program system according to claim 1, wherein said client system includes a communication control module for sending the data to said master server system by affixing to said data a header containing a flag indicating the conversion of said data to be performed by said master server system and a flag indicating processing of data resulting from said conversion by a given one of said server systems;

wherein said master server system includes means for converting the received data so that said data conform with the system specifications of said given one server system by making use of information contained in said library and means for transferring data resulting from said data conversion and an identifier designating the application program for processing said data to said given one server system; and wherein said given one server system includes means for processing the data received from said client system by running the application program designated by said identifier and sending back the processed data to said client system.

3. A distributed application program system according to claim 1, wherein said master server system determines and holds load values corresponding to a number of times the application programs on said server systems and said client system are to run, respectively; and wherein said one server system decides whether or not the data is to be transferred to said another one server system for the processing thereof by checking said load values as held.

4. A distributed application program system according to claim 1, wherein said master server system determines and holds load values corresponding to a number of times the application programs on said server systems and said client system are to run, respectively; and wherein said client system decides to which of said server systems the data is to be transferred for the processing thereof by checking said load values.

5. In a distributed application program system which comprises a data transmission line, a plurality of server systems connected to said data transmission line and each including at least one application program for executing data processing by running said program, and a client system connected to said data transmission line and including at least one application program for executing data processing by running said application program, a method of controlling said distributed application program system, comprising the steps of:

preparing a library for storing system specifications of an individual system in association with one of said plural server systems which is to serve as a master server system;

deciding whether or not a table provided in association with said client system already contains system specifications of the server system to which data processing is to be entrusted;

outputting from said master server system one of the system specifications of said server systems in response to a request received via said data transmission line;

said client system issuing a request for sending system specifications of a server system to which the data processing is to be requested unless said table holds said system specifications and storing said system specifications of said server system received from said master server system in said table while converting the data so as to have a format which conforms with said system specifications stored in said table;

sending to said server system to which said data processing is to be entrusted data of a format conforming with the system specifications of said server system and an identifier designating an application program for executing the data processing; and processing the data received from said client system by said server system by running the application program designated by said identifier and sending data resulting from said processing back to said client system;

wherein when the application program designated by said system identifier contained in the data received from said client system is in an overload state, said server system transfers said data to another one of said plurality of server systems for allowing said another one server system to process said data and send back the processed data to said client system.

6. In a distributed application program system which comprises a data transmission line, a plurality of server systems connected to said data transmission line and each including at least one application program for executing data processing by running said program, and a client system connected to said data transmission line and including at least one application program for executing data processing by running said application program, a method of controlling said distributed application program system, comprising the steps of:

preparing a library for storing system specifications of an individual system in association with one of said plural server systems which is to serve as a master server system;

deciding whether or not a table provided in association with said client system already contains system specifications of the server system to which data processing is to be entrusted;

outputting from said master server system one of the system specifications of said server systems in response to a request received via said data transmission line;

said client system issuing a request for sending system specifications of a server system to which the data processing is to be requested unless said table holds said system specifications and storing said system specifications of said server system received from said master server system in said table while converting the data so as to have a format which conforms with said system specifications stored in said table;

sending to said server system to which said data processing is to be entrusted data of a format conforming with said system specifications of said server system and an identifier designating an application program for executing the data processing; and processing the data received from said client system by said server system by running the application program designated by said identifier and sending data resulting from said processing back to said client system;

wherein said client system decides whether or not said table already holds the system specifications for said server system of concern as received from said master server system and when said system specifications is held in said table, said master server system converts the data so as to have a format which conforms to the system specifications stored in said table without making access to said master server system and transfers to said server system data resulting from said conversion and an identifier designating the application program which is to process said data.

7. A control method for a distributed application program system according to claim 6, further comprising a step in which said master server system determines and holds load values corresponding to a number of times the application programs on said server systems and said client system are to run, respectively;

wherein said server system decides by checking said load values whether or not the data is to be transferred to other server system for the processing thereof.

8. In a distributed application program system which comprises a data transmission line, a plurality of server systems connected to said data transmission line and each including at least one application program for executing data processing by running said program, and a client system connected to said data transmission line and including at least one application program for executing data processing by running said application program, a method of controlling said distributed application program system, comprising the steps of:

preparing a library for storing system specifications of an individual system in association with one of said plural server systems which is to serve as a master server system;

deciding whether or not a table provided in association with said client system already contains system specifications of the server system to which data processing is to be entrusted;

outputting from said master server system one of the system specifications of said server systems in response to a request received via said data transmission line;

said client system issuing a request for sending system specifications of a server system to which the data processing is to be requested unless said table holds said system specifications and storing said system specifications of said server system received from said master server system in said table while converting the data so as to have a format which conforms with said system specifications stored in said table;

sending to said server system to which said data processing is to be entrusted data of a format conforming with said system specifications of said server system and an identifier designating an application program for executing the data processing; and processing the data received from said client system by said server system by running the application program designated by said identifier and sending data resulting from said processing back to said client system;

wherein said master server system determines and holds load values corresponding to a number of times the application programs on said server systems and said client system are to run, respectively; and wherein said client system decides by checking said load values to which of said server systems the data is to be transferred for the processing thereof.

* * * * *